No. 757,872. PATENTED APR. 19, 1904.
W. ALLDERDICE.
PIPE MANDREL.
APPLICATION FILED MAY 22, 1903.
NO MODEL.
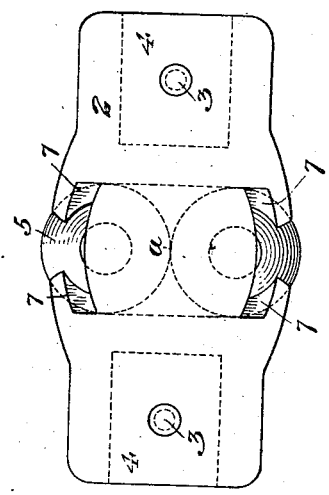
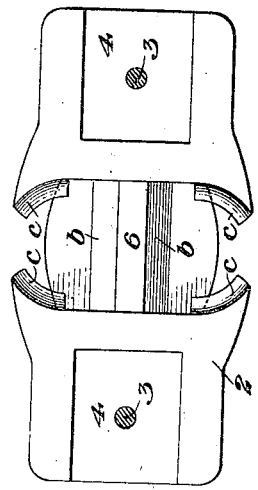
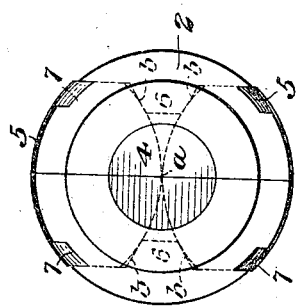
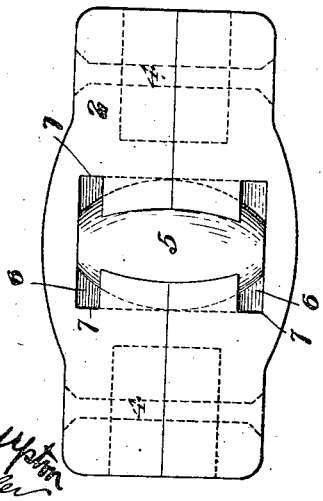
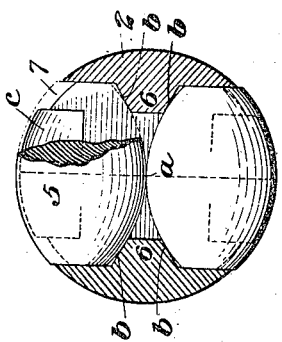
WITNESSES
INVENTOR No. 757,872. Patented April 19, 1904.

UNITED STATES PATENT OFFICE.

WINSLOW ALLDERDICE, OF WARREN, OHIO.

PIPE-MANDREL.

SPECIFICATION forming part of Letters Patent No. 757,872, dated April 19, 1904.

Application filed May 22, 1903. Serial No. 158,247. (No model.)

*To all whom it may concern:*

Be it known that I, WINSLOW ALLDERDICE, of Warren, Trumbull county, Ohio, have invented a new and useful Pipe-Mandrel, of which the following is a full, clear, and exact description, reference being had to the accompanying drawings, forming part of this specification, in which—

Figure 1 shows my improved mandrel in plan view. Fig. 2 is a similar view at a point of the circumference ninety degrees from that of Fig. 1. Fig. 3 is a longitudinal section of the mandrel with the rollers removed. Fig. 4 is an end elevation, and Fig. 5 is a vertical cross-section showing the rollers in elevation.

My mandrel is designed especially for use in the welding of lapweld pipe or for the truing and polishing of pipe made by lapwelding or seamless pipe made by other processes.

The mandrel is provided with rollers forming part of its periphery and adapted when the mandrel is in use to bear on the pipe at points opposite to the rolls. The body 2 of the mandrel is a metal casting made of two or more sections, preferably divided longitudinally and held together at the ends by countersunk rivets 3. Sockets 4 at the ends of the mandrel receive the stems by which the mandrel is manipulated. The rollers 5 5 are elliptical with flattened ends and are set in the mandrel with their peripheries in contact, as at $a$, the circumference of the rollers being curved to correspond to the curvature of the mandrel and forming part of its periphery, as shown in Figs. 2 and 5. These rollers bear at the ends against the body of the mandrel and also have bearings at points $b\,b$ against ribs 6 in the mandrel, which are tangential to the rollers. The recesses in which the rollers are set also have curved bearings $c\,c$ against the periphery of the rollers; but otherwise the rollers are unconfined and may turn with little friction. Slots 7 7 are formed in the mandrel at the ends of the rollers, communicating with the interior space in which the rollers are set, so that free openings are provided for the passage of the scale, which is dislodged from the pipe by the action of the mandrel.

The mandrel is placed in the pass of the rolls, and the pipe to be welded or trued is caused to pass over the same between the rolls, the mandrel being so placed and fixed in position that the rollers 5 5 shall be directly opposite to the rolls. The rotation of the rollers makes the passage of the pipe over the mandrel easy. In truing the pipe they smooth and compact the surface and dislodge the scale therefrom, and in welding pipe they afford a good surface on which the welding may be done.

When the mandrel is used for truing pipe, the pipe is passed back and forth over the mandrel and at each pass is given a quarter-turn, so as to bring fresh lines of its interior to the action of the rollers.

The surface which is produced by the mandrel is smooth, and by ejecting a jet of water into the pipe during the operation a hard-finished surface of magnetic oxid can be produced. The pipe thus treated is well adapted for use as pneumatic tubes and for like purposes where a highly-finished interior is desired.

I claim—

A pipe-mandrel having rollers within the same, said rollers having a bearing against each other at the middle portion, and having tangential bearings against the body of the mandrel, the mandrel having openings leading from the exterior for the passage of scale; substantially as described.

In testimony whereof I have hereunto set my hand.

WINSLOW ALLDERDICE.

Witnesses:
   JOHN MILLER,
   N. M. GRIFFIN.